United States Patent
Sakamaki et al.

(10) Patent No.: US 6,618,037 B2
(45) Date of Patent: Sep. 9, 2003

(54) POINTING DEVICE AND INFORMATION PROCESSING APPARATUS

(75) Inventors: Katsumi Sakamaki, Nakai-machi (JP); Kazuyuki Tsukamoto, Nakai-machi (JP); Koichiro Okamura, Nakai-machi (JP); Shin Takeuchi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/843,811

(22) Filed: Apr. 30, 2001

(65) Prior Publication Data

US 2001/0055001 A1 Dec. 27, 2001

(30) Foreign Application Priority Data

Jun. 23, 2000 (JP) ........................................ 2000-189651

(51) Int. Cl.[7] .................................................. G09G 5/08
(52) U.S. Cl. ........................ 345/163; 345/156; 345/158
(58) Field of Search ................................. 345/161, 163, 345/156, 157, 158, 173, 179, 207

(56) References Cited

U.S. PATENT DOCUMENTS 5,704,037 A * 12/1997 Chen .......................... 345/184
5,959,614 A * 9/1999 Ho ............................. 345/167
6,072,469 A * 6/2000 Chen et al. .................. 345/157
6,116,086 A * 9/2000 Fujimoto ................... 73/504.14
6,121,955 A * 9/2000 Liu ............................. 345/161

FOREIGN PATENT DOCUMENTS

| EP | 0 265 011 A1 | 4/1988 |
| JP | A 1-102619 | 4/1989 |
| JP | A 6-259189 | 9/1994 |

* cited by examiner

*Primary Examiner*—Richard Hjerpe
*Assistant Examiner*—Kimnhung Nguyen
(74) *Attorney, Agent, or Firm*—Oliff & Berridge, PLC

(57) ABSTRACT

A pointing device is provided, enabling to specify a position in a predetermined space easily. A ball is rotatably fitted in the bottom of a body of a pointing device, and the ball rolls when the body moves over a reference surface. A first displacement detecting unit detects displacement of the body relative to the reference surface by detecting the rolling of the ball. A fixed member is fixed to an upper part of the body by way of an elastically bendable supporting member. The moving member can displace relative to the fixed member, and this displacement is detected by a second displacement detecting unit. When the moving member is depressed, the fixed member presses a switch. The switch thus detects whether or not the moving member is being depressed.

6 Claims, 13 Drawing Sheets

FIG.11

- ○ STAND BY (T)
- ● SHUT DOWN (S)
- ○ RESTART (R)
- ○ RESTART IN MS-DOS MODE (M)

POINTING DEVICE AND INFORMATION PROCESSING APPARATUS

BACKGROUND OF THE INVENTION

This invention relates to a pointing device for specifying a position in a predetermined space, and to an information processing apparatus including this pointing device and a display.

An information processing apparatus such as a personal computer often has, as an input device, in addition to a keyboard for inputting characters, a pointing device for pointing to a position on a screen. Examples of pointing devices include mouse devices, joysticks and track balls. Usually, displacement of a body of the pointing device relative to a reference surface is detected, and a cursor showing a position on a screen moves in correspondence with this detected displacement.

In particular, in an information processing apparatus having a graphical user interface for interfacing with a user through visual information on a screen, the pointing device plays an important role. For example, to select an object from among a number of objects displayed on a screen, a pointing device is operated to bring the cursor to above the object to be selected, and by a button provided on the pointing device being depressed the desired object can be selected easily.

Pointing devices which have other functions in addition to the function of simply specifying a position on a screen have been proposed. For example, a pointing device disclosed in Japanese Unexamined Patent Publication No. H.1-102619 is a mouse additionally provided with a digitizer function, and as well as specifying a position on a screen by detecting a two-dimensional displacement with the essential mouse function, it allows the inputting of characters with the digitizer function. And a mouse disclosed in Japanese Unexamined Patent Publication No. H.6-259189, as well as specifying a position on a screen by detecting a two-dimensional displacement with the essential mouse function, allows displayed content on the screen to be scrolled with an added scrolling function. Thus, various proposals have been made to improve the capabilities of pointing devices.

However, because the process of pointing to a position on a screen by operating a pointing device relies on visual information on the screen, for a weak-sighted person it is not easy. In particular, when an object on the screen is small, pointing to a position on the screen by operating a pointing device can be difficult not only for the weak-sighted but even for the fully sighted. And because attentive viewing of the screen is required, there are adverse effects on the health of the operator (for example eye strain and dry eye). In the pointing devices disclosed in the publications mentioned above, although other functions (a digitizer function or a scrolling function) are provided, no improvement of the position specifying function, which is the essential function of a pointing device, has been made. This applies not only to the specifying of a position on a screen by operation of a pointing device but also to the reading of an attribute of an object on a screen in a position specified by operation of a pointing device.

SUMMARY OF THE INVENTION

The present invention has been made in view of the above circumstances and provides a pointing device and an information processing apparatus with which it is possible to specify a position in a predetermined space easily.

A pointing device provided by the invention for specifying a position in a predetermined space has: (1) a first displacement detecting unit, which detects a displacement of a body of the pointing device; (2) a second displacement detecting unit, which has a displacement detecting member and detects a displacement of this displacement detecting member; (3) a position specifying unit, which displaces the origin of a local coordinates system in the predetermined space in correspondence with the displacement of the body detected by the first displacement detecting unit and specifies a position displaced from the origin of the local coordinates system in correspondence with the displacement of the displacement detecting member detected by the second displacement detecting unit; and (4) a stimulus delivery unit, which delivers a stimulus corresponding to the position in the predetermined space specified by the position specifying unit.

Displacement of the body of this pointing device is detected by the first displacement detecting unit and displacement of the displacement detecting member is detected by the second displacement detecting unit. The position specifying unit displaces the origin of a local coordinates system in a predetermined space in correspondence with the displacement of the body detected by the first displacement detecting unit and specifies a position displaced from the origin of the local coordinates system in correspondence with the displacement of the displacement detecting member detected by the second displacement detecting unit. That is, a position corresponding to both the displacement of the body detected by the first displacement detecting unit and the displacement of the displacement detecting member detected by the second displacement detecting unit is specified in the predetermined space. Also, the stimulus delivery unit delivers a stimulus (preferably a tactile stimulus) corresponding to the position in the predetermined space specified by the position specifying unit.

A pointing device according to the invention can have substantially the same form as a mouse or a joystick of related art. In addition to a first displacement detecting unit for detecting a displacement of a body, which a related art mouse device has, a pointing device according to the invention has a second displacement detecting unit for detecting a displacement of a displacement detecting member, a position specifying unit for specifying a position in a predetermined space on the basis of the displacements detected by the first and second displacement detecting units, and a stimulus delivery unit for delivering a stimulus corresponding to this specified position. There are various forms in which the stimulus delivery unit can deliver the stimulus. In this way, it is possible to specify a position in a predetermined space easily.

When the pointing device is used with an information processing apparatus having a display, the predetermined space is a display space on a screen of the display, and a cursor is displayed in the position on the screen specified by the position specifying unit. However, the predetermined space does not necessarily have to be one which can be observed visually, and may alternatively be a predetermined space set imaginarily.

In a pointing device according to the invention, preferably, the ratio of the displacement of the specified position from the origin of the local coordinates system to the displacement of the displacement detecting member is smaller than the ratio of the displacement of the origin of the local coordinates system to the displacement of the body. In this case, moving the body of the pointing device causes the position in the predetermined space (on the screen of a display) to displace in a 'macro' fashion and moving the displacement detecting member causes the position in the predetermined space (on the screen of the display) to displace in a 'micro' fashion. Consequently, it is possible to point to a position in the predetermined space (on the screen of the display) coarsely by moving the pointing device body and to point to a position in the predetermined space (on the screen of the display) finely by moving the displacement detecting member. In this way, it is possible to specify a position in the predetermined space still more easily.

And, preferably, in a pointing device according to the invention, the displacement detecting member is constructed to be movable by a finger of an operator. In this case, whereas moving the pointing device body involves the arm or the wrist, because moving the displacement detecting member involves only a fingertip, the displacement detecting member can be moved with good precision. And in this way also it is possible to specify a position in the predetermined space more easily.

And, preferably, in a pointing device according to the invention, the stimulus delivery unit delivers the stimulus by way of the displacement detecting member. In this case, the operator can point to a position in the predetermined space by moving the displacement detecting member and also the stimulus is delivered by the stimulus delivery unit through this displacement detecting member. And if the displacement detecting member is movable by a finger of an operator, the operator can perform the same action as the action of feeling an article with a fingertip and at the same time can physically experience with the fingertip the tactile feel of the article.

An information processing apparatus provided by the invention has: (1) a pointing device according to the invention as described above, which specifies a position in a predetermined space and delivers a stimulus; (2) a display, which displays the predetermined space and also displays a position in the predetermined space specified by the pointing device; and (3) a stimulus generating unit, which generates a stimulus signal corresponding to the position in the predetermined space specified by the pointing device and causes the pointing device to deliver a stimulus on the basis of this stimulus signal.

In this information processing apparatus, on the display a predetermined space is displayed and also a position in the predetermined space specified by the pointing device is displayed. And, the stimulus delivery unit generates a stimulus signal corresponding to the position in the predetermined space specified by the pointing device and the pointing device delivers a stimulus on the basis of this stimulus signal.

And, preferably, an information processing apparatus according to the invention is further provided with a display state changing unit for changing the state of the display of the predetermined space on the display in correspondence with the position in the predetermined space specified by the pointing device. In this case, the state of the display of the predetermined space on the display is changed by the display state changing unit in correspondence with the position in the predetermined space specified by the pointing device. For example, the display of the predetermined space on the display can be enlarged or reduced in size in correspondence with the relative positional relationship between the position specified by the pointing device and an object on the screen. Then, the operator can point to a position on the screen of the display easily by switching between pointing to the position by moving the pointing device body and pointing to the position by moving the displacement detecting member in correspondence with changes in the state of display of the predetermined space on the display.

BRIEF DESCRIPTION OF THE DRAWINGS

A preferred embodiment of the present invention will be described in detail based on the following figures, wherein:

FIG. 11 shows a display on a screen of the display 30 in a first working example;

DETAILED DESCRIPTION OF THE PREFERRED EMBODIMENTS

Figure 1:
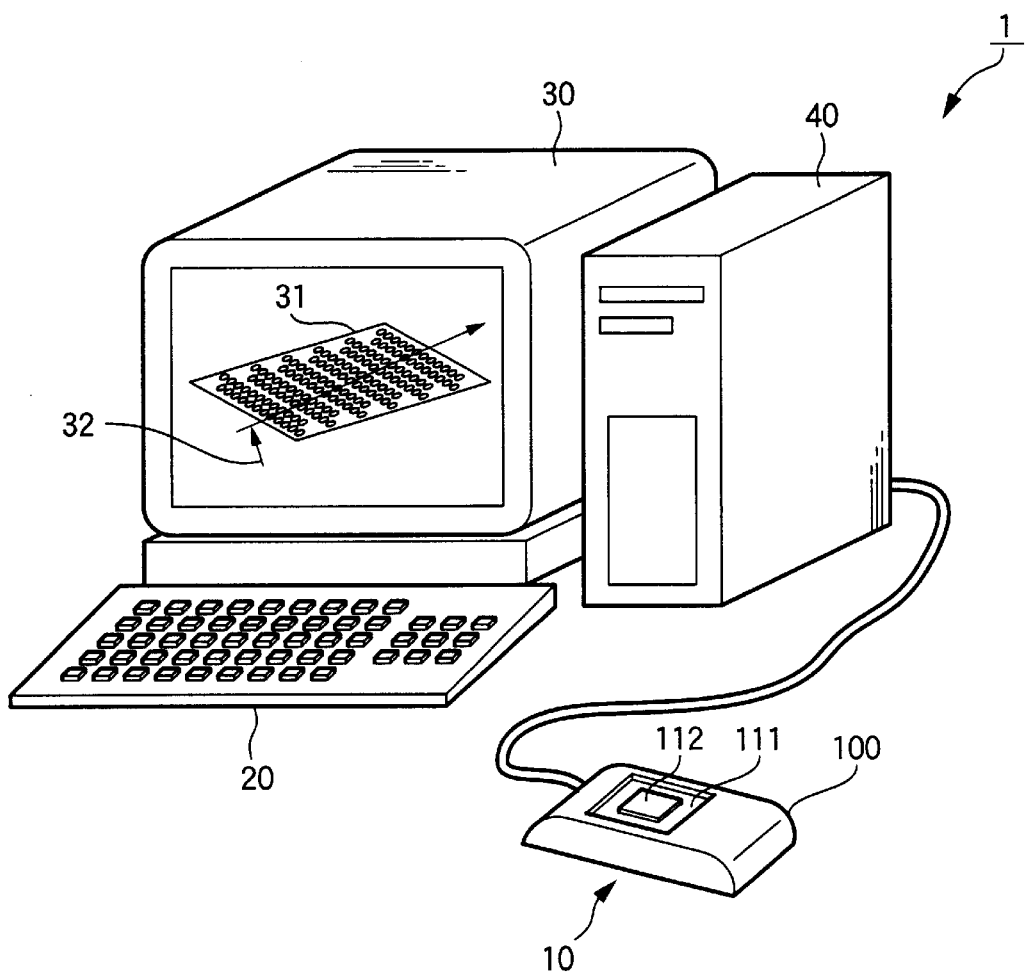
FIG. 1 is an external view of an information processing apparatus 1 of a preferred embodiment of the invention.

A preferred embodiment of the invention will now be described in detail with reference to the drawings. In the explanations of the drawings, the same elements have been assigned the same reference numerals, and duplicate explanations will be omitted.

First, the construction of an information processing apparatus and a pointing device pertaining to this preferred embodiment will be described, using FIGS. 1 through 8. FIG. 1 is an external view of an information processing apparatus 1 pertaining to this preferred embodiment. This information processing apparatus 1 is made up of a pointing device 10, a keyboard 20, a display 30 and a main unit 40. The pointing device 10 is for pointing at a position on the screen of the display 30 and also provides a tactile stimulus to its operator. The keyboard 20 is used for character input and so on. The display 30 displays a picture 31 and also displays a cursor 32 in the position at which the pointing device 10 is pointing and displays characters inputted with the keyboard 20. The main unit 40 includes a CPU, ROM, RAM and so on, and controls and calculates the input and output of various kinds of information through the pointing device 10, the keyboard 20 and the display 30.

Figure 2:
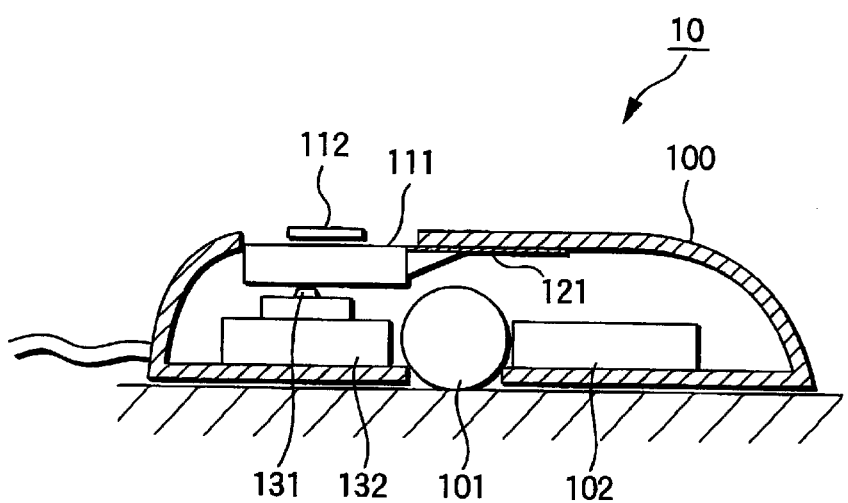
FIG. 2 is a sectional view of a pointing device 10 of the preferred embodiment.

FIG. 2 is a sectional view of the pointing device 10 of this preferred embodiment. This pointing device 10 has substantially the same form as a mouse of related art, and has a ball 101 and a first displacement detecting unit 102. This ball 101 is rotatably fitted in the bottom of a body 100 of the pointing device 10, and as the body 100 moves over a reference surface (for example a desktop or a mouse pad) the ball 101 rotates. The first displacement detecting unit 102 detects a two-dimensional displacement (a direction of movement and an amount of movement) of the body 100 relative to the reference surface, by detecting with an encoder a direction of rotation and an amount of rotation of the ball 101.

The pointing device 10 also has a fixed member 111, a moving member (displacement detecting member) 112 and a supporting member 121. The fixed member 111 is fixed to an upper part of the body 100 by way of the supporting member 121, which can bend elastically. The moving member 112 is movable with respect to the fixed member 111.

Also, the pointing device 10 has a switch 131 and a signal processing circuit 132. When for example the finger of a person operating the pointing device 10 depresses the moving member 112, the fixed member 111 presses the switch 131. That is, the switch 131 detects whether or not the moving member 112 is being depressed, and the signal processing circuit 132 outputs a signal showing whether or not the moving member 112 is being depressed.

Figure 3:
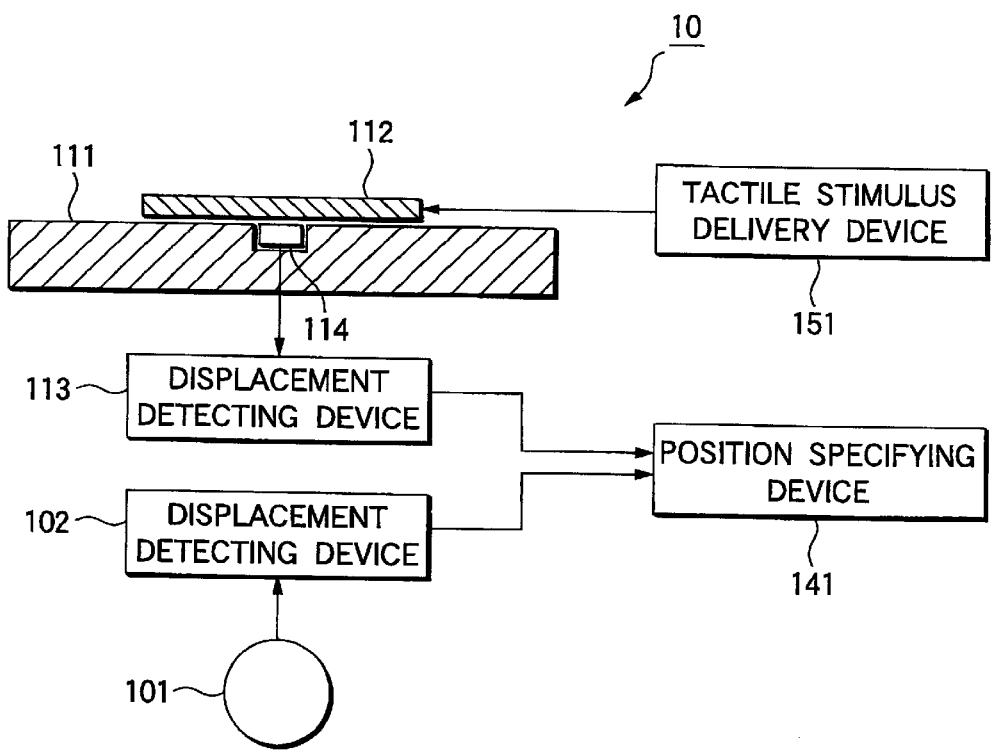
FIG. 3 is a block diagram of the pointing device 10.

FIG. 3 is a block diagram of the pointing device 10 of this preferred embodiment. In this figure, the fixed member 111 and the moving member 112 are shown in sectional view. The fixed member 111 and the moving member 112 each roughly have the shape of a flat plate, and the moving member 112 is movable relative to the fixed member 111. The direction of movement of the moving member 112 is a direction parallel to the face of the fixed member 111, and the moving member 112 is also able to rotate above that face. A second displacement detecting unit 113, together with a position detecting sensor 114, detects displacement (direction of movement and amount of movement) of the moving member 112 relative to the fixed member 111.

A position specifying unit 141 sets a local coordinates system having its origin on the screen of the display 30 and displaces the origin of the local coordinates system in correspondence with a displacement of the body 100 detected by the first displacement detecting unit 102 and specifies a position displaced from the origin of the local coordinates system in correspondence with a displacement of the moving member 112 detected by the second displacement detecting unit 113. A tactile stimulus delivery unit 151 delivers a tactile stimulus to the finger (for example) of an operator touching the top of this moving member 112, by moving the moving member 112 relative to the fixed member 111. The tactile stimulus delivery unit 151 provides a tactile stimulus corresponding to the position on the screen of the display 30 specified by the position specifying unit 141.

From the pointing device 10 to the main unit 40 either information on the position finally specified may be transmitted or the displacement of the body 100 detected by the first displacement detecting unit 102 and the displacement of the moving member 112 detected by the second displacement detecting unit 113 may be transmitted. In the latter case, the position specifying unit 141 of the pointing device 10 of this preferred embodiment is located in the main unit 40.

Figure 4A:
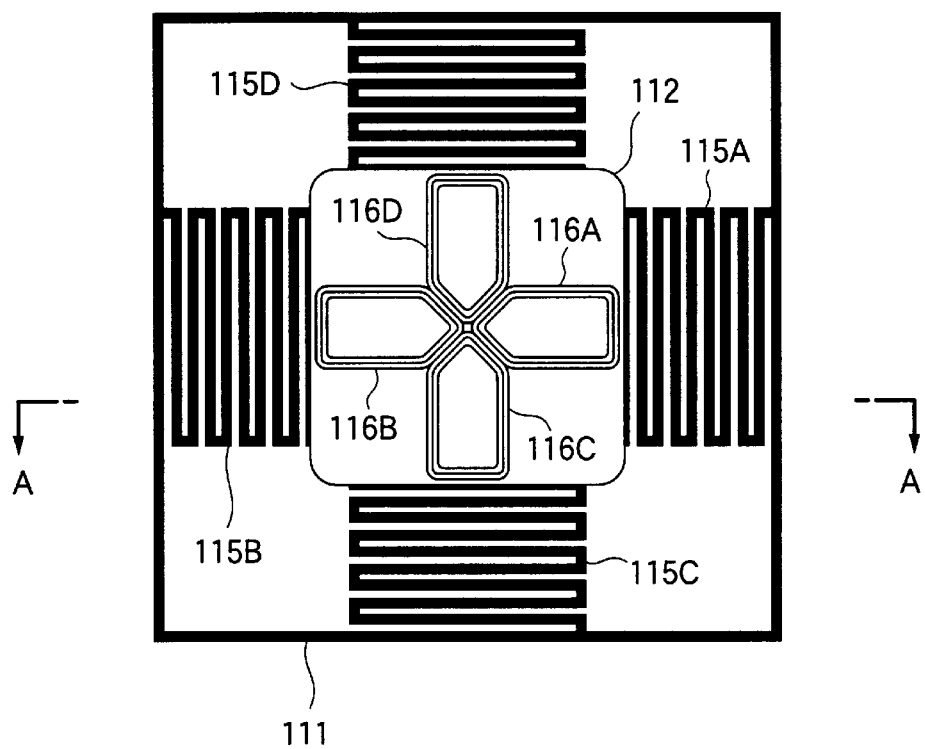
FIG. 4A is a plan view of a fixed member 111 and a moving member 112 of the pointing device 10.
Figure 4B:
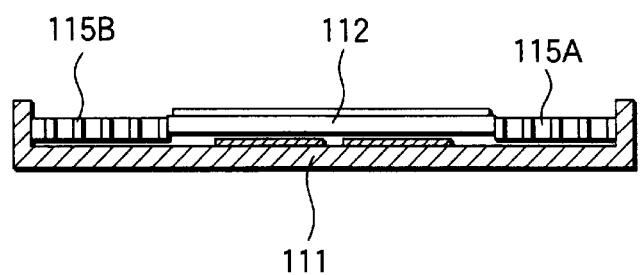
FIG. 4B is a sectional view on A—A in FIG. 4A.

FIGS. 4A and 4B are more detailed construction views of the fixed member 111 and the moving member 112 of the pointing device 10 of this preferred embodiment. FIG. 4A is a plan view and FIG. 4B is a sectional view on the line A—A in FIG. 4A. The pointing device 10 is made up of the fixed member 111, which is substantially plate-shaped, as mentioned above, and has its side edges projecting upward; the moving member 112, which is movable relative to the fixed member 111 in a predetermined plane parallel to the fixed member 111; and elastic members 115A through 115D, disposed between and connecting together the side edges of the fixed member 111 and the moving member 112. The elastic members 115A through 115D are each a piece of elastic resin or a spring and are provided in four locations around the moving member 112 and each have one end joined to the moving member 112 and the other end joined to a side edge of the fixed member 111.

Four coils 116A through 116D are fixed to the moving member 112. If in the plan view of FIG. 4A the center is taken as an origin, the right direction is taken as an X-axis direction and the upward direction is taken as a Y-axis direction, the coil 116A is provided straddling the X-axis in an area where the X-coordinate is positive; the coil 116B is provided straddling the X-axis in an area where the X-coordinate is negative; the coil 116C is provided straddling the Y-axis in an area where the Y-coordinate is negative; and the coil 116D is provided straddling the Y-axis in an area where the Y-coordinate is positive.

Figure 5:
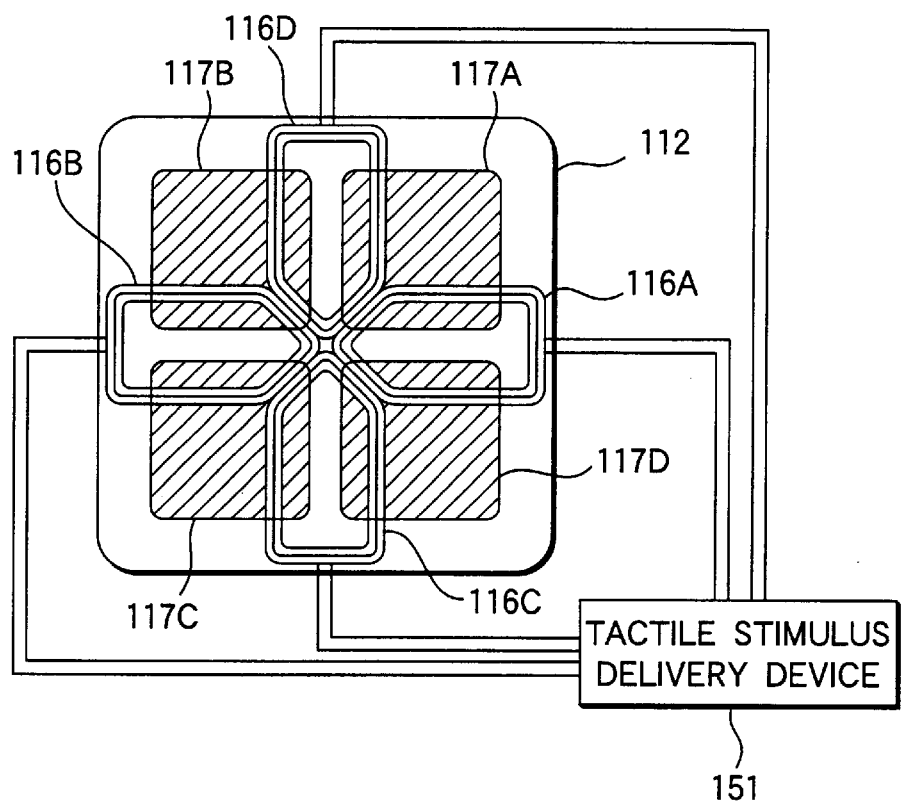
FIG. 5 is a plan view illustrating a tactile stimulus delivery mechanism in the pointing device 10.

FIG. 5 is a plan view illustrating a tactile stimulus delivery mechanism of the pointing device 10 of this preferred embodiment. Four magnets 117A through 117D are fixed to the fixed member 111. The magnet 117A is so provided that its magnetic flux passes through both the coil 116A and the coil 116D in an area where the X-coordinate is positive and the Y-coordinate is also positive. The magnet 117B is so provided that its magnetic flux passes through both the coil 116B and the coil 116D in an area where the X-coordinate is negative and the Y-coordinate is positive. The magnet 117C is so provided that its magnetic flux passes through both the coil 116B and the coil 116C in an area where the X-coordinate is negative and the Y-coordinate is also negative. And the magnet 117D is so provided that its magnetic flux passes through both the coil 116A and the coil 116C in an area where the X-coordinate is positive and the Y-coordinate is negative. Of these, the magnet 117A and the magnet 117C are each so disposed that the side thereof facing the moving member 112 constitutes an S-pole, and the magnet 117B and the magnet 117D are each so disposed that the side thereof facing the moving member 112 constitutes an N-pole.

In other words, the relative positions of the coils 116A through 116D and the magnets 117A through 117D are as follows. The coil 116A is so provided that its current crosses the magnetic fields formed by the magnets 117A and 117D in a direction parallel to the X-axis. The coil 116B is so provided that its current crosses the magnetic fields formed by the magnets 117B and 117C in a direction parallel to the X-axis. The coil 116C is so provided that its current crosses the magnetic fields formed by the magnets 117C and 117D in a direction parallel to the Y-axis. And the coil 116D is so provided that its current crosses the magnetic fields formed by the magnets 117A and 117B in a direction parallel to the Y-axis.

For each of the coils 116A through 116D, copper wire may be used, or, to reduce their weight, aluminum wire may be used. Copper-plated aluminum wire is also suitable. For the magnets 117A through 117D, magnets having high coercive force and residual magnetic flux density are preferable, and for example neodymium magnet are suitable.

The tactile stimulus delivery unit 151 can pass a current through each of the coils 116A through 116D independently. And depending on the sizes and directions of the respective currents passed through the coils 116A through 116D, mutual actions according to Fleming's left hand rule arise between the coils 116A through 116D and the magnetic fields formed by the magnets 117A through 117D. As a result of this, thrust forces act on each of the coils 116A through 116D, and in correspondence with these thrust forces and the stresses in the respective elastic members 115A through 115D, the moving member 112 moves relative to the fixed member 111. And by this movement of the moving member 112, a tactile stimulus is delivered to the finger of the operator touching the top of the moving member 112.

Figure 6:
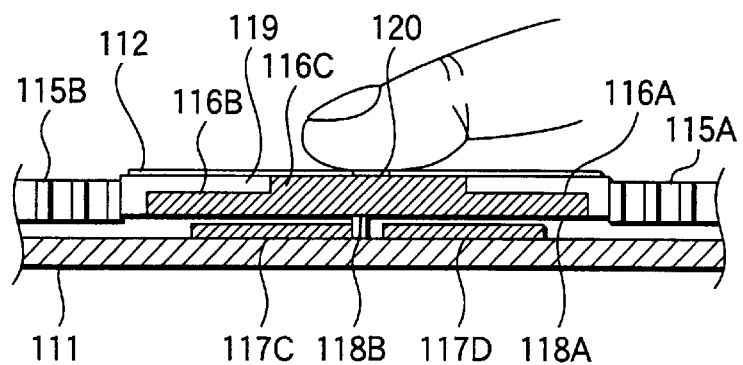
FIG. 6 is a sectional view illustrating a mechanism of sliding between the fixed member 111 and the moving member 112 in the pointing device 10.

FIG. 6 is a sectional view illustrating a mechanism in the pointing device 10 of this preferred embodiment for allowing the moving member 112 to slide over the fixed member 111. Sliding members 118A and 118B are provided respectively on the lower face of the moving member 112, to which the coils 116A through 116D are fixed, and the upper face of the fixed member 111, to which the magnets 117A through 117D are fixed. For each of the sliding members 118A and 118B, a fluororesin having a low coefficient of friction (for example polytetrafluoroethylene), or a resin or metal impregnated with a lubricating oil is preferably used. Alternatively a lubricating oil may be coated between the sliding members 118A and 118B, or non-magnetic balls interposed between them so that sliding is allowed by rolling of these balls.

Figure 7:
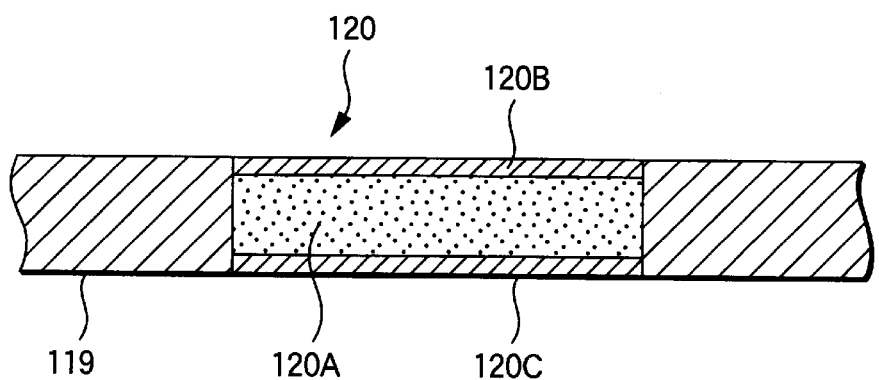
FIG. 7 is a sectional view illustrating a pressure-sensitive part 120 in the pointing device 10.

In addition to this sliding mechanism, FIG. 6 also shows a surface layer 119 on the upper face of the moving member 112 and a pressure-sensitive part 120 provided at the center of this surface layer 119. FIG. 7 is a sectional view illustrating the pressure-sensitive part 120 in the pointing device 10 of this preferred embodiment. The surface layer 119 is finished flat so that a human finger or a receptive organ such as a palm can be brought in and out of contact with it. The pressure-sensitive part 120 detects that a human finger or the like is contact with the surface layer 119. The pressure-sensitive part 120 has a construction wherein a pressure-sensitive conducting rubber 120A, for which a material made by mixing silicone rubber and a conductive powder is used, is sandwiched between conducting plastic layers 120B and 120C. A voltage is impressed across the conducting plastic layer 120B and the conducting plastic layer 120C, and a change of electrical resistance caused by contact pressure when a human finger or the like touches the pressure-sensitive part 120 is detected to detect whether or not there is contact. A contact detection signal outputted from this first displacement pressure-sensitive part 120 is sent to the tactile stimulus delivery unit 151, and when contact is confirmed the moving member 112 is driven by the tactile stimulus delivery unit 151.

There are other methods besides this for detecting that a human finger or the like is in contact with the moving member 112. For example, the moving member 112 may be provided with a charge accumulating part for accumulating and holding a predetermined charge so that when a human finger or the like touches the moving member 112 a charge that had been held by the charge accumulating part flows out into the human finger. It is then possible to detect that a human finger or the like has contacted the moving member 112 by detecting a resulting change in the charge accumulated on the charge accumulating part. Or, the moving member 112 may be provided with two flexible electrodes supported a fixed distance apart so that when a human finger or the like contacts one of the electrodes the distance between the two electrodes changes. It is then possible to detect that a human finger or the like has contacted the moving member 112 by detecting a resulting change in a static capacitance existing between the two electrodes. Or, a light-receiving unit may be provided on the upper face of the moving member 112 and another light-receiving unit provided on the upper face of a side edge part of the fixed member 111. Then, on the basis of changes in output signals from these light-receiving units, it is possible to detect that a human finger or the like has contacted the moving member 112 by detecting a resulting fall in the value of the output signal from the light-receiving unit on the upper face of the moving member 112.

Figure 8:
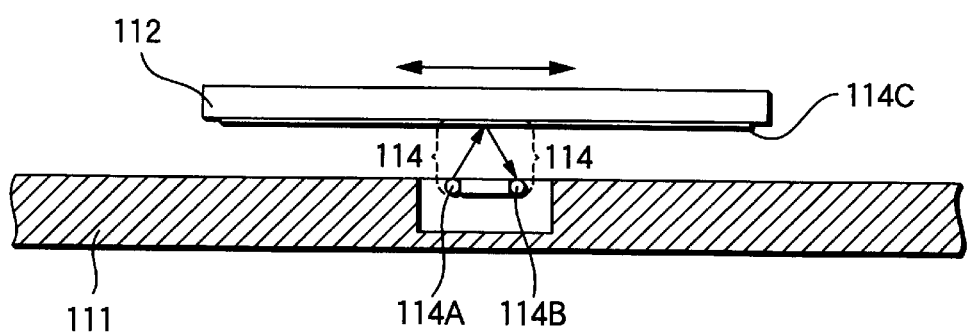
FIG. 8 is a sectional view illustrating a position detecting sensor 114 in the pointing device 10.

FIG. 8 is a sectional view illustrating the position detecting sensor 114 in the pointing device 10 of this preferred embodiment. The position detecting sensor 114 includes a light-emitting unit (for example a light-emitting diode) 114A and a light-receiving unit (for example a photodiode) 114B fixed to the fixed member 111, and an optical pattern (for example a uniformly spaced pattern of shades or a checkered pattern) 114C drawn on the underside of the moving member 112. Light emitted from the light-emitting unit 114A strikes the optical pattern 114C and light reflected by the optical pattern 114C is received by the light-receiving unit 114B. The amount of light received by the light-receiving unit 114B corresponds to the reflectivity of the optical pattern 114C at the position where it is struck by the light emitted from the light-emitting unit 114A.

Therefore, on the basis of a change in an electrical signal outputted from the light-receiving unit 114B in correspondence with this amount of received light, it is possible to detect the amount of displacement of the moving member 112 relative to the fixed member 111. And by providing a position detecting sensor 114 of this kind respectively for the X-axis direction and for the Y-axis direction, it is possible to detect the amount of displacement of the moving member 112 relative to the fixed member 111 in each of two dimensions. An output signal from this position detecting sensor 114 is sent to the second displacement detecting unit 113 and the displacement of the moving member 112 is detected in the second displacement detecting unit 113.

There are other methods besides this for detecting the displacement of the moving member 112. For example, laser light can be shone at fine irregularities formed in the underside of the moving member 112 to create a speckle pattern and the amount of displacement of the moving member 112 relative to the fixed member 111 in two dimensions then detected by observing this speckle pattern with a two-dimensional image sensor. Or, a rotating body contacting the moving member 112 may be provided and the displacement of the moving member 112 relative to the fixed member 111 detected by detecting with an encoder the amount of rotation of this rotating body. Or, two-dimensional displacement of the moving member 112 relative to the fixed member 111 may be detected by providing a light-emitting unit on either the fixed member 111 or the moving member 112 and providing a two-dimensional position detecting unit (PSD: Position-Sensitive Detector) on the other.

Next, the tactile stimulus delivery operation of the pointing device 10 will be explained. When a current is passed through each of the coils 116A through 116D, driven by the tactile stimulus delivery unit 151, a thrust force acts on each of the coils 116A through 116D in accordance with Fleming's left hand rule, and as a result the moving member 112 moves.

First, considering the coil 116A and the coil 116B, if a magnetic field is formed in the Z-axis direction, which is the direction perpendicular to the fixed member 111, and a current flows through this magnetic field in the X-axis direction, a thrust force in the Y-axis direction arises. When a current flows through the coil 116A in the clockwise direction, a thrust force acts on the coil 116A in the +Y-axis direction. And when a current flows through the coil 116B in the counterclockwise direction, a thrust force acts on the coil 116B in the +Y-axis direction. By changing the direction in which the currents flow it is possible to change the directions in which the thrust forces act, and by changing the values of the currents it is possible to change the sizes of the thrust forces.

Similarly, considering the coil 116C and the coil 116D, when a magnetic field is formed in the Z-axis direction, which is the direction perpendicular to the fixed member 111, and a current flows through this magnetic field in the Y-axis direction, a thrust force in the X-axis direction arises. When a current flows through the coil 116C in the clockwise direction, a thrust force acts on the coil 116C in the +X-axis direction. And when a current flows through the coil 116D in the counterclockwise direction, a thrust force acts on the coil 116D in the +X-axis direction. By changing the directions in which the currents flow it is possible to change the directions in which the thrust forces act, and by changing the values of the currents it is possible to change the sizes of the thrust forces.

When it is only necessary for the moving member 112 to be moved translationally with respect to the fixed member 111, the coils 116A and 116B can be connected together so that a thrust force is applied to each of the coils 116A and 116B in the same direction and the coils 116C and 116D can be connected together so that a thrust force is applied to each of the coils 116C and 116D in the same direction.

It is also possible to create thrust forces in directions such that they rotate the moving member 112 relative to the fixed member 111 substantially about the Z-axis. That is, when currents flow through each of the coils 116A and 116B in the clockwise direction, a thrust force acts in the +Y-axis direction on the coil 116A and a thrust force acts in the −Y-axis direction on the coil 116B, and consequently a rotational moment tending to rotate the moving member 112 relative to the fixed member 111 in the counterclockwise direction arises. When currents flow through each of the coils 116A and 116B in the counterclockwise direction, a thrust force acts in the −Y-axis direction on the coil 116A and a thrust force acts in the +Y-axis direction on the coil 116B, and consequently a rotational moment tending to rotate the moving member 112 relative to the fixed member 111 in the clockwise direction arises. And by changing the ratio of the values of the respective currents flowing through the coils 116A and 116B, it is possible to change the center of rotation. The same applies to the coil 116C and the coil 116D.

Figure 9A:
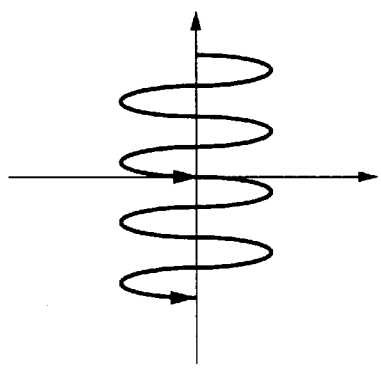
FIGS. 9A through 9D illustrate examples of the operation of the moving member 112 of the pointing device 10.
Figure 9B:
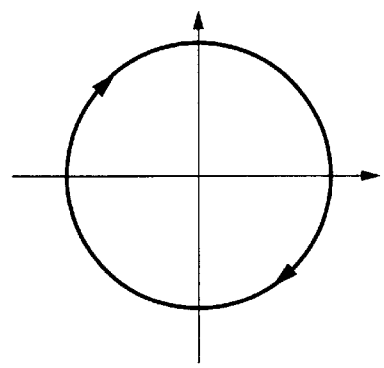
Figure 9C:
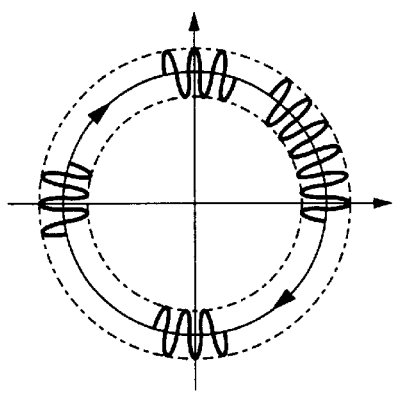
Figure 9D:
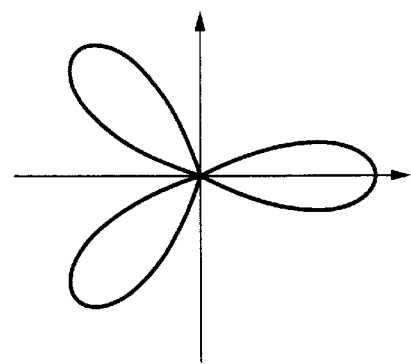

This movement of the moving member 112 is driven by currents supplied to the coils 116A through 116D by the tactile stimulus delivery unit 151. In the control executed at this time, for example PD control (proportional-differential control) executed in correspondence with a positional deviation and a differential of the positional deviation is used. FIGS. 9A through 9D are views illustrating examples of the operation of the moving member 112 of the pointing device 10 in this preferred embodiment. In FIG. 9A, the moving member 112 is oscillating finely to the left and right while moving continuously in the −Y-axis direction. In FIG. 9B, the moving member 112 is revolving translationally in the clockwise direction. In FIG. 9C, the moving member 112 is revolving translationally in the clockwise direction while oscillating finely to the left and right with respect to the direction of translational rotation. And in FIG. 9D, the moving member 112 is oscillating translationally. The moving member 112 can also move so as to describe a figure of '8' or a 'W'. And the moving member 112 can move not only at a fixed speed but also with acceleration or deceleration. The movement of the moving member 112 corresponds to the currents supplied to the coils 116A through 116D by the tactile stimulus delivery unit 151, and when a human finger touches the moving member 112 lightly, that finger can feel this movement of the moving member 112.

Figure 10A:
FIGS. 10A through 10G illustrate different cursor displays on a display 30 of the information processing apparatus 1 and a position specifying operation of the pointing device 10.
Figure 10B:
Figure 10C:
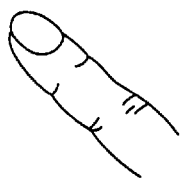
Figure 10D:
Figure 10E:

Next, position specifying operation of the pointing device 10 and cursor display on the display 30 will be explained, using FIGS. 10A through 10G. The shape of the cursor 32 displayed on the screen of the display 30 can be any shape, such as an arrow shape (FIG. 10A), a pointing finger shape (FIGS. 10B, 10C), a cross shape (FIG. 10D), or a pinching fingertips shape (FIG. 10E). A cursor in the shape of an arrow (FIG. 10A) shows a position with the tip of the arrow. A cursor in the shape of a pointing finger (FIGS. 10B, 10C) shows a position with the tip of the finger. A cursor in the shape of a cross (FIG. 10D) shows a position with the intersection of the cross. And a cursor in the shape of pinching fingertips (FIG. 10E) shows a position with the mid-point between the two pinching fingertips.

When an operator moves the body 100 of the pointing device 10, this movement is detected by the first displacement detecting unit 102, and in correspondence with this detected movement the origin of the local coordinates system set on the screen of the display 30 displaces and the cursor displaces to the origin of the local coordinates system. Then, when the operator moves the moving member 112 while keeping the body 100 held still, the moving member 112 displaces relative to the fixed member 111; this displacement is detected by the second displacement detecting unit 113; and the cursor displaces further to a position in the local coordinates system corresponding to this detected displacement.

Figure 10F:
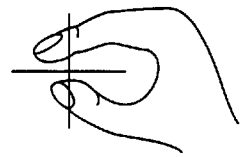

The shape of the cursor 32 displayed on the screen of the display 30 may preferably be a combination of two of those described above. For example, as shown in FIG. 10F, the shape of the cursor 32 may be a combination of a cross shape and a pinching fingers shape. In this case, the intersection of the cross of the cross shape shows the origin of the local coordinates system set on the screen of the display 30 in correspondence with the displacement of the body 100 detected by the first displacement detecting unit 102 of the pointing device 10. And the mid-point between the two pinching fingertips shows the position in the local coordinates system set on the screen of the display 30 in correspondence with the displacement of the moving member 112 detected by the second displacement detecting unit 113 of the pointing device 10.

Figure 10G:
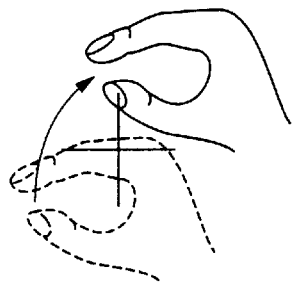

That is, when the operator moves the body 100 of the pointing device 10, this movement is detected by the first displacement detecting unit 102 and in correspondence with this detected movement, the cross part of the cursor displaces on the screen of the display 30. If the operator is not moving the moving member 112 and the moving member 112 is in a predetermined equilibrium position relative to the fixed member 111, as shown in FIG. 10F the mid-point between the two pinching fingertips of the cursor coincides with the intersection of the cross part. When on the other hand the operator moves the moving member 112, the moving member 112 displaces relative to the fixed member 111 and this displacement is detected by the second displacement detecting unit 113 and in correspondence with this detected displacement, as shown in FIG. 10G, the mid-point between the two pinching fingertips of the cursor displaces relative to the intersection of the cross part. The position of the mid-point between the two pinching fingertips of the cursor is specified by the position specifying unit 141.

Preferably, it is made possible for the operator to switch between the display of a single cursor shape of the kind shown in FIGS. 10A through 10E and the display of a combination of two cursor shapes of the kind shown in FIGS. 10F and 10G.

And preferably, the ratio of the displacement of the specified position from the origin of the local coordinates system to the displacement of the moving member 112 is smaller than the ratio of the displacement of the origin of the local coordinates system to the displacement of the body 100. In this case, moving the body 100 causes the position on the screen of the display 30 to displace in a 'macro' fashion and moving the moving member 112 causes the position on the screen of the display 30 to displace in a 'micro' fashion. Accordingly, it is possible to point to a position on the screen of the display 30 coarsely by moving the body 100 and to point to a position on the screen of the display 30 finely by moving the moving member 112.

Next, the relationship between the position specifying operation and the tactile stimulus delivery operation of the pointing device 10 will be explained. The delivery of a tactile stimulus through the moving member 112 by the tactile stimulus delivery unit 151 is carried out in correspondence with the position on the screen of the display 30 specified by the position specifying unit 141. That is, the main unit 40 of the information processing apparatus 1 has a tactile stimulus generating unit, and this tactile stimulus generating unit generates a tactile stimulus signal corresponding to the position on the screen of the display 30 specified by the position specifying unit 141 of the pointing device 10 and causes the tactile stimulus delivery unit 151 of the pointing device 10 to deliver a tactile stimulus on the basis of this tactile stimulus signal.

For example, when an object is being displayed on the screen of the display 30 and the distance between the object and the position on the screen of the display 30 specified by the position specifying unit 141 is less than a predetermined value, the tactile stimulus delivery unit 151 may notify the operator of this by causing the moving member 112 to oscillate in accordance with a tactile stimulus signal generated by the tactile stimulus generating unit. And, in this case, the tactile stimulus delivery unit 151 may forcibly move the moving member 112 in accordance with a tactile stimulus signal generated by the tactile stimulus generating unit so that the position specified by the position specifying unit 141 comes to above the object. Also, when the position specified by the position specifying unit 141 lies or moves above the object, the tactile stimulus delivery unit 151 may, by way of the moving member 112, in accordance with a tactile stimulus signal generated by the tactile stimulus generating unit, deliver a tactile stimulus corresponding to an attribute of that object. Besides these, various other forms of relationship between the position specifying operation and the tactile stimulus delivery operation of the pointing device 10 are possible. Specific working examples of some of these will be described below.

In a first working example, as shown in FIG. 11, the pointing device 10 is used to select an object from among a number of objects displayed on the screen of the display 30. When like the so-called radio buttons shown in this figure, the objects displayed on the screen of the display 30 are small, if a related art pointing device is used, selecting an object is difficult. However, when the information processing apparatus 1 and the pointing device 10 of this preferred embodiment are used, by performing the following operations, it is possible to select an object easily.

That is, the operator first moves the cursor to the proximity of the object to be selected by moving the body 100 of the pointing device 10, and then moves the cursor toward the object to be selected by moving the moving member 112 of the pointing device 10. Whereas moving the body 100 involves the arm or the wrist, because moving the moving member 112 involves only a fingertip, the moving member 112 can be moved with good precision. And compared with the 'macro' movement of the cursor resulting from movement of the body 100, by moving the moving member 112 it is possible to move the cursor in a 'micro' fashion. Consequently, it is easy to bring the cursor to overlap the object.

Also, if the tactile stimulus delivery unit 151 is made to deliver a tactile stimulus (for example an oscillation) to the moving member 112 when the position specified by the position specifying unit 141 (the cursor position on the screen of the display 30) has come to overlap the object, even without looking attentively at the screen the operator can recognize easily that the cursor has overlapped the object. Or, when the operator moves the body 100 or the moving member 112 to make the cursor approach the object, if the distance between the cursor and the object falls to below a certain fixed value, the tactile stimulus delivery unit 151 may be made to forcibly move the moving member 112 so that the position specified by the position specifying unit 141 (the cursor position) comes to above the object. And when the cursor position has overlapped with the object, the operator can select that object by depressing (clicking) the moving member 112 with a fingertip.

In this case, the tactile stimulus generating unit in the main unit 40 of the information processing apparatus 1 generates a tactile stimulus signal in correspondence with the distance between the object and the position on the screen of the display 30 specified by the position specifying unit 141 of the pointing device 10, and on the basis of this tactile stimulus signal the tactile stimulus delivery unit 151 of the pointing device 10 delivers a tactile stimulus (oscillation or thrust force) by way of the moving member 112.

Figure 12A:
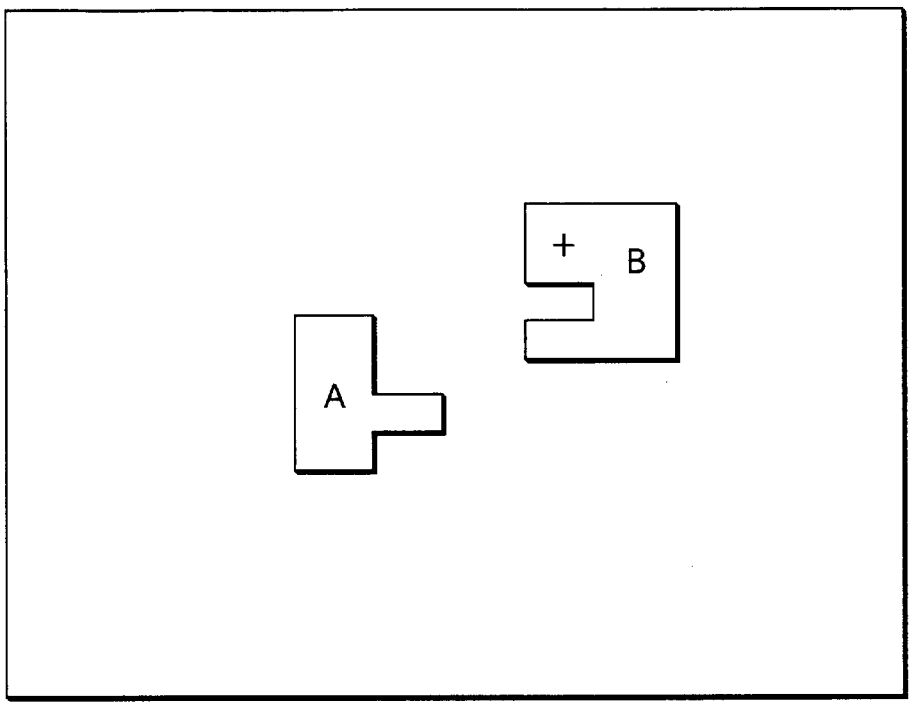
FIGS. 12A and 12B show displays on a screen of the display 30 in a second working example.
Figure 12B:
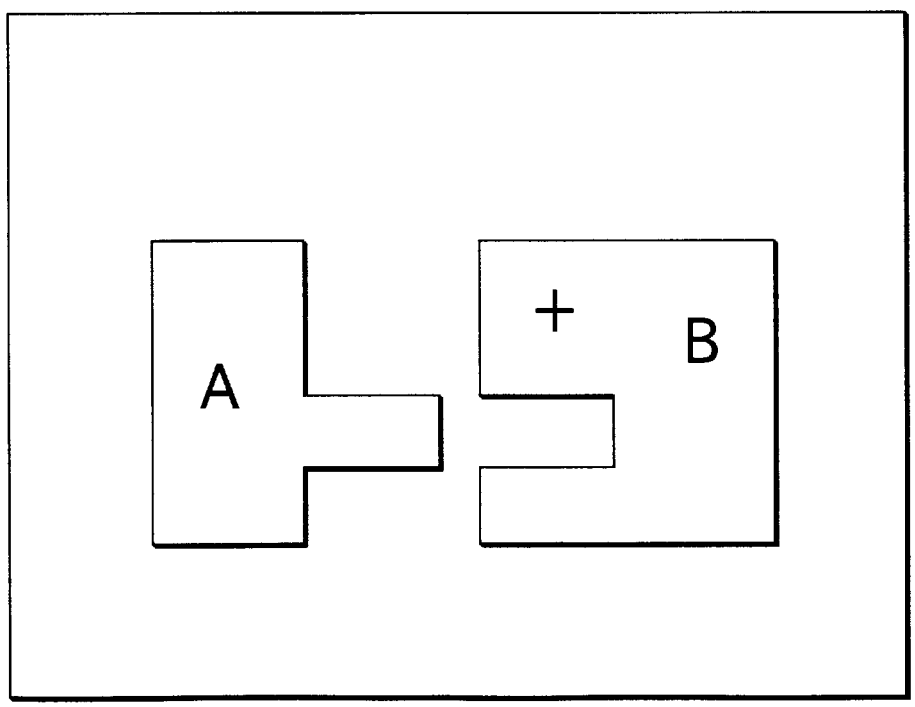

In a second working example, as shown in FIGS. 12A and 12B, a CAD operation is carried out on the screen of the display 30 by means of operation of the pointing device 10. On the screen of the display 30 are two graphic elements A and B which can be fitted together, and the operator operates the pointing device 10 to move the graphic element B and fit a cutaway part in the graphic element B onto a projecting part of the graphic element A. At this time, when a related art pointing device is used, fitting the graphic element A and the graphic element B together exactly is difficult, and the two tend to overlap or move apart. However, when the information processing apparatus 1 and the pointing device 10 of this preferred embodiment are used, by the performing the following operations it is possible to fit the graphic element A and the graphic element B together exactly.

That is, the operator first moves the cursor to overlap the graphic element B by moving the body 100 of the pointing device 10 and then depresses the moving member 112 and with the switch 131 still thus pressed moves the graphic element B to the proximity of the graphic element A by moving the body 100. After that, by moving the moving member 112 with the moving member 112 depressed and the switch 131 thus still pressed, the operator fits the graphic element B to the graphic element A. Then, when the two are fitted together, the operator stops depressing the moving member 112. In this working example also, Whereas moving the body 100 involves the arm or the wrist, because moving the moving member 112 involves only a fingertip, the moving member 112 can be moved with good precision. And compared with the 'macro' movement of the cursor resulting from movement of the body 100, by moving the moving member 112 it is possible to move the cursor in a 'micro' fashion. Consequently, it is easy to fit the graphic element A and the graphic element B together exactly.

And if the tactile stimulus delivery unit 151 is made to deliver a tactile stimulus (for example an oscillation) to the moving member 112 when the graphic element A and the graphic element B make contact, even without looking attentively at the screen the operator can recognize easily that the graphic element A and the graphic element B have made contact. In this case, the tactile stimulus generating unit in the main unit 40 of the information processing apparatus 1 generates a tactile stimulus signal in correspondence with the distance between the graphic element B in the position on the screen of the display 30 specified by the position specifying unit 141 of the pointing device 10 and the other graphic element A, and on the basis of this tactile stimulus signal the tactile stimulus delivery unit 151 of the pointing device 10 delivers a tactile stimulus signal (oscillation) by way of the moving member 112.

Also, when the operator moves the body 100 or the moving member 112 to make the graphic element B approach the graphic element A, if the distance between the graphic element A and the graphic element B falls to below a certain fixed value, the display on the screen of the display 30 may be enlarged (FIGS. 12A→12B). When this is done, the graphic element A and the graphic element B can be exactly fitted together still more easily. In this case, the main unit 40 of the information processing apparatus 1 has a display state changing unit, and this display state changing unit enlarges or reduces the display on the screen of the display 30 in correspondence with the distance between the graphic element B, which is being moved, and the other graphic element A. And by switching in correspondence with the display state of the screen of the display 30 between pointing by moving the body 100 of the pointing device 10 and pointing by moving the moving member 112, the operator can point to a position on the screen of the display 30 easily.

Figure 13:
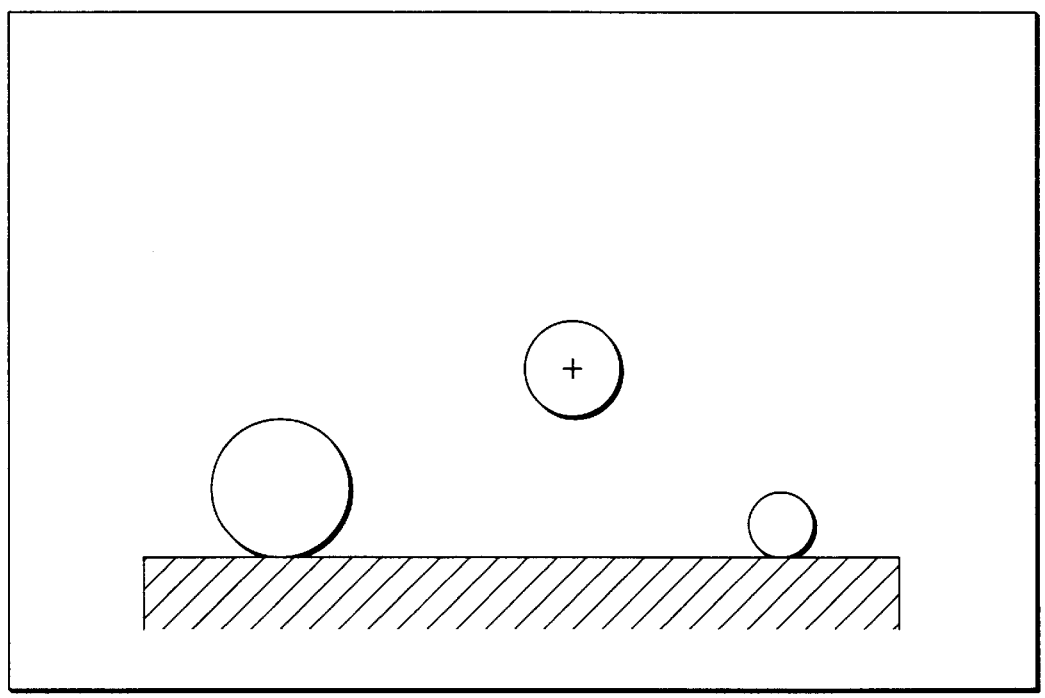
FIG. 13 shows a display on a screen of the display 30 in a third working example.

In a third working example, as shown in FIG. 13, spheres displayed on the screen of the display 30 are moved by operation of the pointing device 10. On this screen are displayed three spheres each having a different set weight. The operator moves the cursor to overlap one of the spheres by moving the body 100 or the moving member 112 of the pointing device 10, depresses the moving member 112 and thus presses the switch 131, and then can lift that sphere by moving the moving member 112. At this time, a force corresponding to the weight of the lifted sphere is delivered to the fingertip on the moving member 112 by the tactile stimulus delivery unit 151.

In this case, the tactile stimulus generating unit in the main unit 40 of the information processing apparatus 1 generates a tactile stimulus signal corresponding to the set weight of the sphere in the position on the screen of the display 30 specified by the position specifying unit 141 of the pointing device 10, and on the basis of this tactile stimulus signal the tactile stimulus delivery unit 151 of the pointing device 10 delivers a tactile stimulus (reaction) by way of the moving member 112. As a result, the operator can physically feel the weight of the sphere being lifted by movement of the moving member 112.

An example similar to this third working example is a case wherein a background having a rough/smoothness distribution is displayed on the screen of the display 30 and an object is moved over the background by movement of the moving member 112 of the pointing device 10. At this time, the tactile stimulus generating unit in the main unit 40 of the information processing apparatus 1 generates a tactile stimulus signal corresponding to the rough/smoothness of the part of the background where the object is and on the basis of this tactile stimulus signal the tactile stimulus delivery unit 151 of the pointing device 10 delivers a tactile stimulus (fluctuation of reaction) by way of the moving member 112. As a result, the operator can physically feel the rough/smoothness of the background at the position of the object pointed to by movement of the moving member 112.

Figure 14:
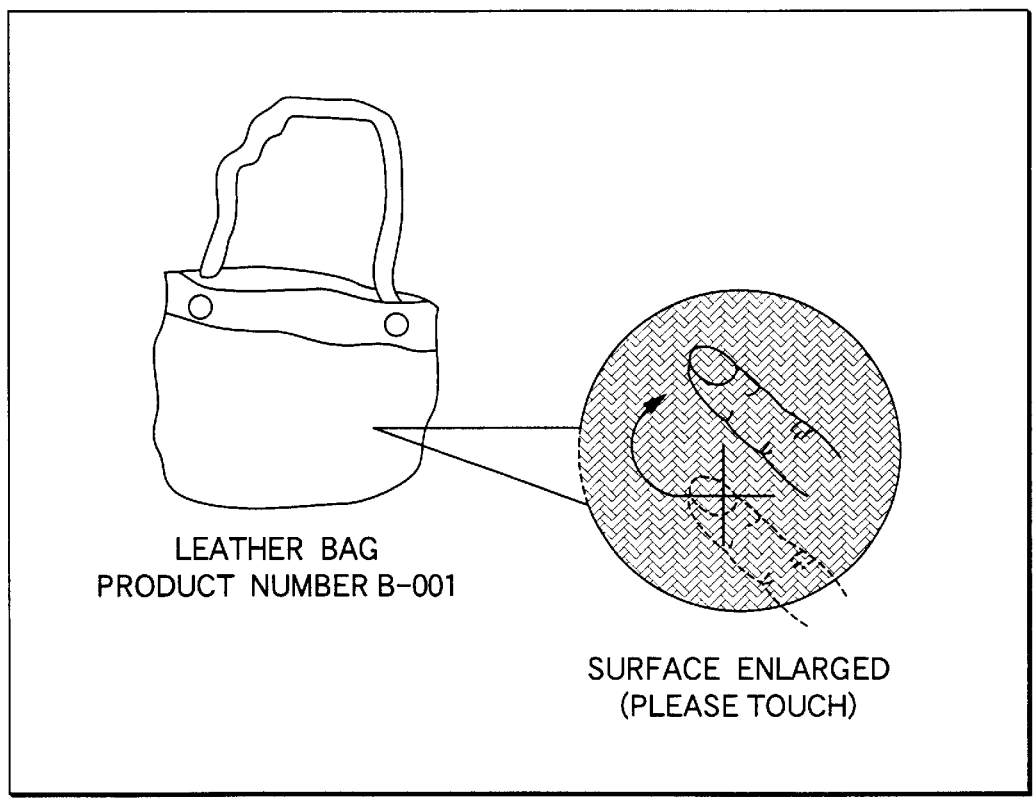
FIG. 14 shows a display on a screen of the display 30 in a fourth working example.

In a fourth working example, as shown in FIG. 14, the feel to the touch of the surface of an article displayed on the screen of the display 30 can be physically experienced by operation of the pointing device 10. On Internet home pages and in electronic shopping malls and the like, products may be introduced, and image information showing the shape of a product and its price may be provided. However, in the case of some products (for example the cloth of an item of clothing or a sofa covering, the material of a bag, or wallpaper or the like), the tactile feel of the product may be important information. In this case, by using the pointing device 10 of this preferred embodiment, it is possible to obtain information on the tactile feel of a product.

That is, the operator first displays an image of the product of interest on the screen of the display 30. Then, by moving the body 100 or the moving member 112 of the pointing device 10, the operator moves the cursor to above the image of the product. And then, by moving the moving member 112, the operator moves the cursor around over the image of the product. And at this time, the tactile stimulus delivery unit 151 delivers to the fingertip resting on the moving member 112 a force corresponding to the tactile feel of the product.

In this case, as information on the product, besides the image displayed on the screen, attribute information on tactile feel is appended. The tactile stimulus generating unit in the main unit 40 of the information processing apparatus 1 generates a tactile stimulus signal corresponding to the attribute information appended to the information of the product on the screen of the display 30 specified by the position specifying unit 141 of the pointing device 10, and on the basis of this tactile stimulus signal the tactile stimulus delivery unit 151 of the pointing device 10 delivers a tactile stimulus by way of the moving member 112. As a result, by moving the moving member 112 with a fingertip, the operator can perform the same action as the action of feeling a product with a fingertip, and at the same time can physically experience with the fingertip the tactile feel of the product displayed on the screen of the display 30.

Figure 15:
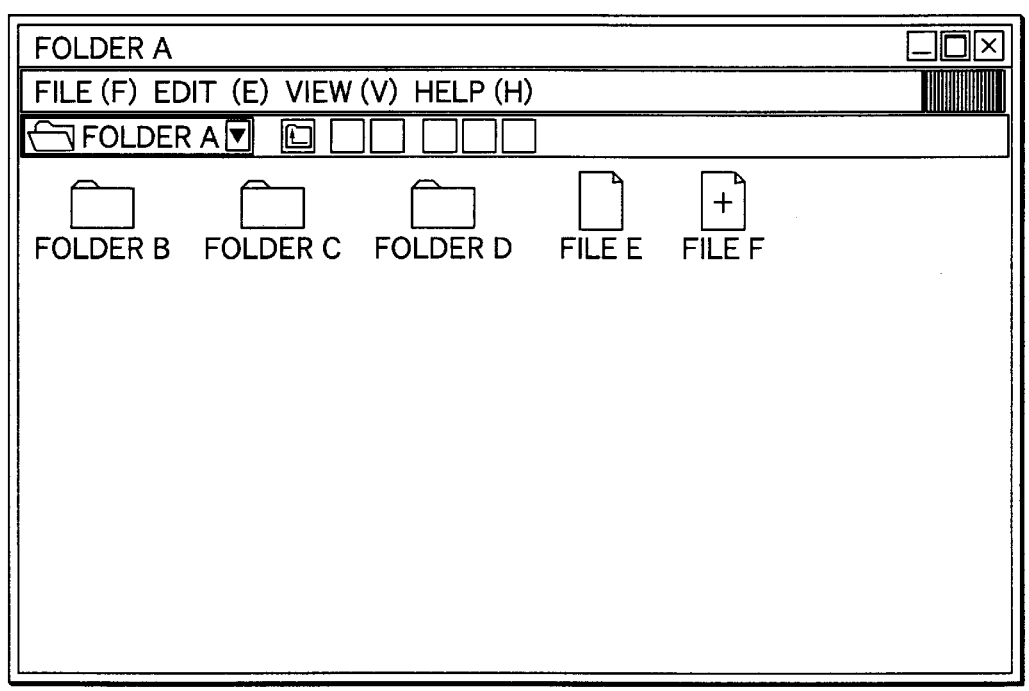
FIG. 15 shows a display on a screen of the display 30 in a fifth working example.

In a fifth working example, as shown in FIG. 15, attributes of different types of object displayed on the screen of the display 30 are detected by operation of the pointing device 10. Types of object displayed on the screen of the display 30 include for example icons, folders, and files. If the pointing device 10 of this preferred embodiment is used, it is possible to ascertain attributes (type, size, name and so on) of different kinds of object displayed on the screen of the display 30.

That is, the operator first moves the cursor to above an object on the screen by moving the body 100 or the moving member 112 of the pointing device 10 and then presses the switch 131 by depressing the moving member 112. Then, by moving the moving member 112, the operator moves the cursor on the screen. At this time, the tactile stimulus delivery unit 151 delivers a tactile stimulus corresponding to an attribute of that object to the fingertip resting on the moving member 112. For example, a different tactile stimulus may be delivered in correspondence with the type of the object, or when the object is a file, a reaction of a size corresponding to the file size may be delivered as the tactile stimulus.

And when the cursor has come to above an object on the screen, the tactile stimulus delivery unit 151 may move the moving member 112 so as to write the name of that object. When this is done, through the movement of the moving member 112, the fingertip resting on the moving member 112 can read the name of the object over which the cursor is positioned.

In this case, attribute information on type, size and so on is appended to objects displayed on the screen. The tactile stimulus generating unit in the main unit 40 of the information processing apparatus 1 generates a tactile stimulus signal corresponding to the attribute information appended to the object on the screen of the display 30 specified by the position specifying unit 141 of the pointing device 10, and on the basis of this tactile stimulus signal the tactile stimulus delivery unit 151 of the pointing device 10 delivers a tactile stimulus by way of the moving member 112. As a result, the operator can easily ascertain the attributes of objects on the screen.

Also, the pointing device 10 of this preferred embodiment can be used to append attribute information to an object displayed on the screen of the display 30. That is, the operator first selects a predetermined item on a menu to invoke a mode for appending attribute information and then moves the cursor to above an object on the screen by moving the body 100 or the moving member 112 of the pointing device 10 and presses the switch 131 by depressing the moving member 112. Then, by moving the moving member 112, the operator moves the cursor on the screen. The movement of the moving member 112, i.e. the movement of the cursor, at this time then becomes the tactile stimulus delivered to the moving member 112 by the tactile stimulus delivery unit 151 when the cursor revisits this object thereafter.

For example, at an object with which information in the form of characters is displayed on the screen, attribute information can be appended to that object by switching to the mode for appending attribute information and then moving the moving member 112 in such a way as to trace those characters. And whenever the cursor comes to that object thereafter, the tactile stimulus delivery unit 151 causes the moving member 112 to move in such a way as to trace the characters associated with the object. When this is done, through the movement of the moving member 112, the fingertip resting on the moving member 112 can read the characters associated with the object over which the cursor is positioned.

The present invention is not limited to the preferred embodiment described above, and various changes are possible. For example, whereas the pointing device 10 of the preferred embodiment described above is in the form of a mouse and is of a rotational contact type wherein displacement of the body 100 is detected by detecting rotation of a ball 101 over a reference surface, it may alternatively be a non-contact, optical type wherein displacement of the body 100 is detected by detecting changes in optical shade of a reference surface.

And the pointing device 10 does not have to be in the form of a mouse, and may alternatively be in the form of a joystick. When it is in the form of a joystick, a moving member may be provided at the end of the joystick and a tactile stimulus delivered to this moving member. When this is done the moving member can be moved with the thumb of a hand gripping the joystick, and the tactile stimulus can be felt with this thumb.

And whereas in the preferred embodiment described above a tactile stimulus is provided, alternatively some other stimulus, for example a light or sound stimulus, can be provided. And such different kinds of stimulus can be used selectively or used together.

Also, although in the preferred embodiment described above the displacement detecting member is the moving member 112, which is movable relative to the fixed member 111, and the second displacement detecting unit 113 detects displacement of the moving member 112, the invention is not limited to this configuration. For example, alternatively a displacement detecting member may be fixed to the body of the pointing device and the second displacement detecting unit made to detect displacement of a finger or the like in contact with this displacement detecting member. Specifically, this can be realized by means of a track pad for detecting displacement of a finger or the like on the basis of changes in static capacitance caused by the finger.

As described above in detail, in a pointing device according to the present invention, displacement of the body of the pointing device is detected by a first displacement detecting unit and displacement of a displacement detecting member is detected by a second displacement detecting unit. A position corresponding to both the displacement of the body detected by the first displacement detecting unit and the displacement of the displacement detecting member detected by the second displacement detecting unit is specified in a predetermined space by a position specifying unit. And a tactile stimulus delivery unit delivers a tactile stimulus corresponding to the position in the predetermined space specified by the position specifying unit.

In this way, by having in addition to a first displacement detecting unit for detecting the displacement of the body, which mouse devices of related art have, a second displacement detecting unit for detecting the displacement of a displacement detecting member, a position specifying unit for specifying a position in a predetermined space on the basis of the respective displacements detected by the first and second displacement detecting units, and a tactile stimulus generating unit for delivering a tactile stimulus corresponding to this specified position, a pointing device according to the invention can easily point to a position in a predetermined space.

And, preferably, the ratio of the displacement of the specified position from the origin of the local coordinates system to the displacement of the displacement detecting member is smaller than the ratio of the displacement of the origin of the local coordinates system to the displacement of the body. In this case, it is possible to point to a position in the predetermined space (on the screen of a display) coarsely by moving the pointing device body and to point to a position in the predetermined space (on the screen of the display) finely by moving the displacement detecting member, and consequently it is possible to specify a position in the predetermined space still more easily.

And, preferably, the displacement detecting member is constructed to be movable by a finger of an operator. In this case, whereas moving the pointing device body involves the arm or the wrist, because moving the displacement detecting member involves only a fingertip, the displacement detecting member can be moved with good precision, and consequently it is possible to specify a position in the predetermined space still more easily.

And, preferably, the tactile stimulus delivery unit delivers the tactile stimulus by way of the displacement detecting member. In this case, the operator can point to a position in the predetermined space by moving the displacement detecting member and also the tactile stimulus is delivered by the stimulus delivery unit through this displacement detecting member. And if the displacement detecting member is movable by a finger of an operator, the operator can perform the same action as the action of feeling an article with a fingertip and at the same time can physically experience with the fingertip the tactile feel of the article.

With an information processing apparatus according to this invention, as well as a predetermined space being displayed on a display, a position in the predetermined space specified by means of the pointing device is also displayed. Also, a tactile stimulus signal corresponding to the position in the predetermined space specified by means of the pointing device is generated by a tactile stimulus generating unit, and the pointing device delivers a tactile stimulus on the basis of this tactile stimulus signal. As a result, it is possible to point to a position in the predetermined space displayed on the display easily.

And, preferably, the information processing apparatus is further provided with a display state changing unit for changing the state of the display of the predetermined space on the display in correspondence with the position in the predetermined space specified by the pointing device. In this case, the display state changing unit changes the state of the display of the predetermined space on the display in correspondence with the position in the predetermined space specified by the pointing device. Then, the operator can point to a position on the screen of the display easily switching between pointing to the position by moving the pointing device body and pointing to the position by moving the displacement detecting member in correspondence with changes in the state of display of the predetermined space on the display.

The entire disclosure of Japanese Patent Application No. 2000-189651 filed on Jun. 23, 2000 including specification, claims, drawings and abstract is incorporated herein by reference in its entirety.

What is claimed is:

1. A pointing device for specifying a position in a predetermined space, comprising:

first displacement detecting means for detecting a displacement of a body of the pointing device;

second displacement detecting means, which has a displacement detecting member, for detecting a displacement of this displacement detecting member;

position specifying means for displacing the origin of a local coordinates system in the predetermined space in correspondence with the displacement of the body detected by the first displacement detecting means and specifying a position displaced from the origin of the local coordinates system in correspondence with the displacement of the displacement detecting member detected by the second displacement detecting means; and stimulus delivery means for delivering a stimulus corresponding to the position in the predetermined space specified by the position specifying means.

2. A pointing device according to claim 1, wherein the ratio of the displacement of the specified position from the origin of the local coordinates system to the displacement of the displacement detecting member is smaller than the ratio of the displacement of the origin of the local coordinates system to the displacement of the body.

3. A pointing device according to claim 1, wherein the displacement detecting member is movable by a finger of an operator.

4. A pointing device according to claim 1, wherein the stimulus delivery means delivers the stimulus by way of the displacement detecting member.

5. An information processing apparatus, comprising:

a pointing device according to claim 1, which specifies a position in a predetermined space and delivers a stimulus;

a display, which displays the predetermined space and also displays a position in the predetermined space specified by the pointing device; and stimulus generating means for generating a stimulus signal corresponding to the position in the predetermined space specified by the pointing device and causing the pointing device to deliver a stimulus on the basis of this stimulus signal.

6. An information processing apparatus according to claim 5, further comprising display state changing means for changing the state of the display of the predetermined space on the display in correspondence with the position in the predetermined space specified by the pointing device.

* * * * *